(No Model.)
J. F. KELLY.
ALTERNATING CURRENT DYNAMO.
No. 518,740. Patented Apr. 24, 1894.
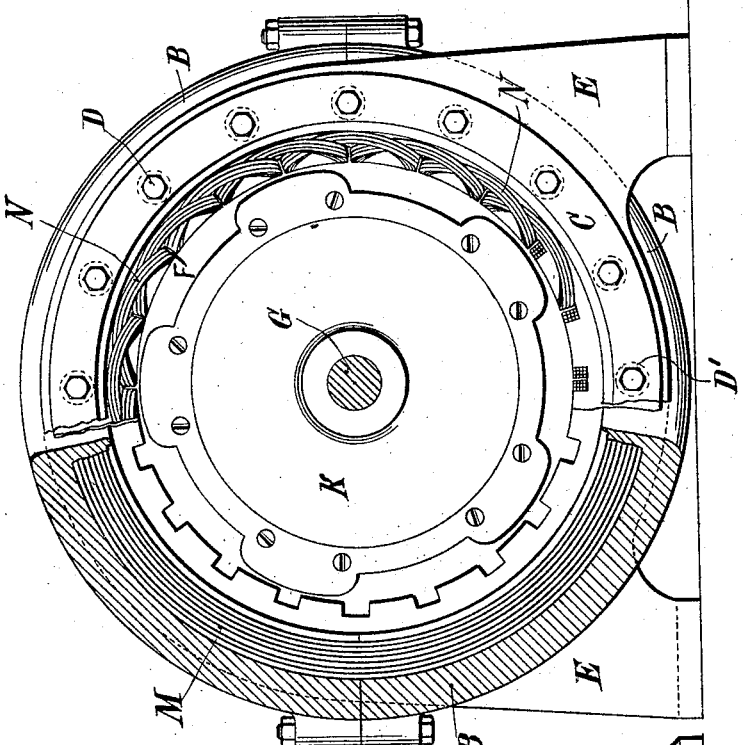
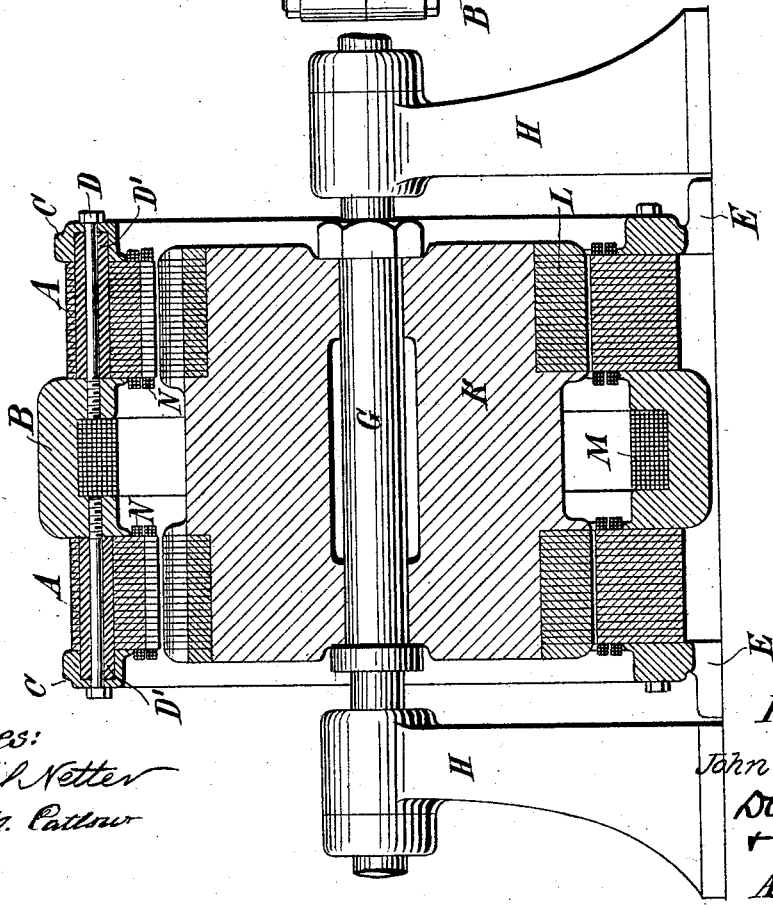
Witnesses:
Raphael Netter
James N. Catlow
Inventor
John F. Kelly by
Duncan
+ Page
Attorneys

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

ALTERNATING-CURRENT DYNAMO.

SPECIFICATION forming part of Letters Patent No. 518,740, dated April 24, 1894.

Application filed December 22, 1893. Serial No. 494,393. (No model.)

*To all whom it may concern:*

Be it known that I, JOHN F. KELLY, a citizen of the United States, residing at Pittsfield, in the county of Berkshire and State of Massachusetts, have invented certain new and useful Improvements in Alternating-Current Dynamos, of which the following is a specification, reference being had to the drawings accompanying and forming a part of the same.

My present invention is an improvement in the alternating current generator shown and described in a patent to William Stanley, Jr., and John F. Kelly, dated June 13, 1893, No. 499,446 and in other generators generally in which the plan of construction is designed to confine the variation of the magnetic flux to the polar projections or parts of the armature upon which the coils are wound.

Referring to the drawings which illustrates the general feature of the construction of a machine embodying my invention, Figure 1 is a central vertical section of the same in line with the shaft, and Fig. 2 is an end view of the generator with portions of the outer plates removed.

The stator portion of the machine is composed of an annulus built up of iron plates or laminæ A A, a center ring or body B, and end rings C bound together by bolts D which pass through the end rings and sleeves D' extending through holes in plates A, and screw into the center ring B. The circular frame thus formed is mounted on supports E E forming part of the annular end plates or rings C. The plates A constitute polar extensions at opposite edges of the circular frame, in the faces of which are cut recesses or grooves F for the reception of the induced coils.

The rotor portion of the generator consists of a shaft G mounted in bearings H and carrying a core of iron or steel K. The core K is provided with polar extensions L which are, preferably, laminated, and are secured to the core in any suitable manner.

M is the energizing or field coil which is placed in the center ring B, so that when traversed by a continuous current it establishes a field of force in the magnetic circuit through the polar extensions A and L and the intermediate portions of the circular frame and core K.

The induced coils N are wound or laid in the transverse grooves F and the polar extensions L are stamped or punched out in such manner that when assembled they will present a series of poles, the width of the faces of which is approximately equal to the distance between the centers of any two adjacent grooves in the polar extensions A, which contain the coils of one circuit, so that in the present machine, which has two induced circuits in quadrature, the poles of the rotor element when just approaching or leaving the coils of one circuit are central with respect to the coils of the other.

In a machine of this general plan of construction, when in operation, the electrical connections being established in the usual way the tendency will be to confine the variation of magnetic flux to the polar extensions A and L. In practice however, I have found that serious trouble may be caused by the development of hysteresis and Foucault currents as the field cores are swept around, the whole of the iron of the stator element being liable to a change of flux. The magnetic circuit, it will be seen, is through the laminæ A and the bolts D on one side, the cast iron center ring or body B and the laminæ and bolts on the other side, but if any portion of this circuit that directly bridges the poles L has a much lower magnetic reluctance than the intermediate parts which at the moment lie opposite the spaces between two adjacent pairs of poles, the main flux from L L would pass through the more direct path. Then as the poles are carried around, the path of the flux would vary, which would give rise to Foucault currents and cause heating and waste of energy.

It would be possible to prevent the Foucault currents by the lamination of the iron in the proper direction, but this would not avoid the hysteretic loss and would add very materially to the cost of construction. To avoid this result I so proportion the machine that the magnetic reluctance of all portions of the iron bridging the two polar extensions A A is substantially equal. This is accomplished by making the reluctance of this part of the path which constitutes the body of the armature, high, relatively to the laminated pole pieces, in any well known way as by lengthening the body or yoke between the pole pieces, but preferably by increasing, relatively to the material used—the density of the said bridge or body, that is by increasing the number of magnetic lines per unit area which it carries. By this means the change of flux is confined to the laminated portion or pole pieces of the armature which is all that is required for the development of electromotive force in the coils N.

The invention is not limited to any specific plan of securing a high reluctance in the body of the armature relatively to the polar projections.

What I claim is—

1. An armature or secondary element for an alternating current generator comprising polar projections in combination with induced coils thereon, and a body or yoke bridging the said projections—the reluctance of the body being high relatively to that of said projections.

2. An armature or secondary element for an alternating current electrical generator comprising polar projections in combination with induced coils thereon, and a body or yoke bridging the projections, the said body being of high density relatively to the polar projections, as set forth.

3. In an alternating current induction machine the combination of a rotary core having outwardly projecting poles and constituting the field or primary element of the machine, a stationary magnetic annulus provided with corresponding and inwardly projecting polar extensions, an intermediate ring or body of high density, forming a bridge between the polar extensions, an energizing coil between the polar extensions and induced coils wound upon said extension, as set forth.

JOHN F. KELLY.

Witnesses:
JOHN F. VAN DEUSEN,
ERNEST B. CASTLE.